US010298517B2

(12) United States Patent
Iovanna et al.

(10) Patent No.: US 10,298,517 B2
(45) Date of Patent: May 21, 2019

(54) METHOD AND APPARATUS FOR ALLOCATING PHYSICAL RESOURCES TO A SUMMARIZED RESOURCE

(71) Applicant: TELEFONAKTIEBOLAGET LM ERICSSON (PUBL), Stockholm (SE)

(72) Inventors: Paola Iovanna, Pisa (IT); Cristiano Zema, Pisa (IT)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 212 days.

(21) Appl. No.: 15/116,359

(22) PCT Filed: Feb. 17, 2014

(86) PCT No.: PCT/EP2014/053013
§ 371 (c)(1),
(2) Date: Aug. 3, 2016

(87) PCT Pub. No.: WO2015/120912
PCT Pub. Date: Aug. 20, 2015

(65) Prior Publication Data
US 2016/0352648 A1    Dec. 1, 2016

(51) Int. Cl.
*H04L 12/927* (2013.01)
*H04L 12/911* (2013.01)
(Continued)

(52) U.S. Cl.
CPC ............ *H04L 47/805* (2013.01); *H04L 45/02* (2013.01); *H04L 45/04* (2013.01); *H04L 45/302* (2013.01);
(Continued)

(58) Field of Classification Search
CPC .. G06F 9/5016–9/5083; H04L 12/5695; H04L 12/66; H04L 41/12; H04L 45/04;
(Continued)

(56) References Cited

U.S. PATENT DOCUMENTS 6,385,201 B1 * 5/2002 Iwata ................... H04L 49/205
370/255
7,908,606 B2 * 3/2011 Depro ................. G06F 11/3409
700/90
(Continued)

FOREIGN PATENT DOCUMENTS

WO    2009118050 A1    10/2009
WO    2011103913 A1    9/2011
(Continued)

OTHER PUBLICATIONS

International Search Report dated Nov. 10, 2014 in related International Application No. PCT/EP2014/053013.
(Continued)

*Primary Examiner* — Alicia Baturay
*Assistant Examiner* — Rajeshwari Krishnan
(74) *Attorney, Agent, or Firm* — Patent Portfolio Builders, PLLC

(57) ABSTRACT

Aspects of the invention relate to a method of adapting an association of physical resources in a network with a summarized resource corresponding to one or more class of service. The method comprises monitoring at least one parameter of the summarized resources. The method further comprises comparing the at least one parameter between a plurality of summarized resources, and comparing the class of service of the summarized resources. Based on the comparing of the at least one parameter and based on the comparing of the class of service of the summarized resources, the method comprises determining one or more summarized resources to be a source for providing physical resources and determining one or more summarized resources to be a destination for receiving physical resources. Based on the determining, the method comprises modifying an allocation of physical resources to transfer an
(Continued)

association of physical resources from the source summarized resource to the destination summarized resource.

17 Claims, 4 Drawing Sheets

(51) Int. Cl.
*H04L 12/803* (2013.01)
*H04L 12/751* (2013.01)
*H04L 12/715* (2013.01)
*H04L 12/721* (2013.01)
*H04L 12/725* (2013.01)

(52) U.S. Cl.
CPC .......... *H04L 47/125* (2013.01); *H04L 47/823* (2013.01); *H04L 45/123* (2013.01); *H04L 45/70* (2013.01)

(58) Field of Classification Search
CPC ............. H04L 45/12; H04L 45/70; H04L 47/70–47/724; H04L 45/02; H04L 45/123; H04L 45/245; H04L 45/323; H04L 12/1822–12/189; H04L 41/00–41/0896; H04L 47/10–47/2425; H04L 47/805–47/823
See application file for complete search history.

(56) References Cited

U.S. PATENT DOCUMENTS

| | | | | |
|---|---|---|---|---|
| 8,559,334 B2* | 10/2013 | Iovanna | ................. | H04L 45/12 370/254 |
| 9,794,129 B2* | 10/2017 | Iovanna | ................. | H04L 41/12 |
| 2001/0029543 A1* | 10/2001 | Iwata | ................. | H04L 45/00 709/233 |
| 2001/0032272 A1* | 10/2001 | Fujita | ................. | H04L 45/12 709/241 |
| 2003/0099203 A1* | 5/2003 | Rajan | ................. | H04L 41/12 370/238 |
| 2004/0170125 A1* | 9/2004 | O'Neill | ................. | H04L 12/185 370/230 |
| 2005/0160171 A1* | 7/2005 | Rabie | ................. | H04L 41/0893 709/227 |
| 2006/0023698 A1* | 2/2006 | Shore | ................. | H04L 47/10 370/352 |
| 2006/0039391 A1* | 2/2006 | Vasseur | ................. | H04L 45/04 370/409 |
| 2006/0140115 A1* | 6/2006 | Timus | ................. | H04L 47/10 370/230 |
| 2006/0285523 A1* | 12/2006 | Ishii | ................. | H04W 16/10 370/335 |
| 2007/0002770 A1* | 1/2007 | Haalen | ................. | H04L 12/66 370/256 |
| 2007/0233866 A1* | 10/2007 | Appleby | ................. | H04L 67/1008 709/226 |
| 2009/0003225 A1* | 1/2009 | Klassen | ................. | H04L 43/50 370/250 |
| 2009/0141636 A1* | 6/2009 | Dolganow | ................. | H04L 45/04 370/237 |
| 2009/0265450 A1* | 10/2009 | Helmer | ................. | H04L 41/0893 709/221 |
| 2010/0035626 A1* | 2/2010 | Iwamoto | ................. | H04W 28/18 455/452.1 |
| 2010/0040069 A1* | 2/2010 | Johri | ................. | H04L 45/04 370/400 |
| 2010/0208721 A1* | 8/2010 | Miyazaki | ................. | H04L 45/04 370/351 |
| 2011/0010518 A1* | 1/2011 | Kavuri | ................. | G06F 3/0647 711/165 |
| 2011/0055370 A1* | 3/2011 | Kern | ................. | G06F 9/5083 709/224 |
| 2011/0106934 A1* | 5/2011 | Sadasivan | ................. | H04L 41/00 709/223 |
| 2011/0229126 A1* | 9/2011 | Gerstel | ................. | H04L 41/0896 398/25 |
| 2011/0292832 A1* | 12/2011 | Bottari | ................. | H04L 41/0896 370/254 |
| 2012/0218924 A1* | 8/2012 | Bhalla | ................. | H04L 47/2425 370/310 |
| 2012/0226799 A1* | 9/2012 | Kapur | ................. | G06F 9/5044 709/224 |
| 2012/0311153 A1* | 12/2012 | Morgan | ................. | H04L 12/00 709/226 |
| 2013/0021909 A1* | 1/2013 | Bader | ................. | H04L 12/5695 370/237 |
| 2013/0028094 A1* | 1/2013 | Gao | ................. | H04L 47/724 370/238 |
| 2013/0070638 A1* | 3/2013 | Iovanna | ................. | H04L 41/12 370/254 |
| 2013/0097601 A1* | 4/2013 | Podvratnik | ................. | G06F 9/5027 718/1 |
| 2013/0114744 A1* | 5/2013 | Mutton | ................. | H04N 19/40 375/240.26 |
| 2013/0156175 A1* | 6/2013 | Bekiares | ................. | H04L 12/1822 379/202.01 |
| 2013/0336107 A1* | 12/2013 | Vasseur | ................. | H04L 41/0654 370/218 |
| 2014/0137110 A1* | 5/2014 | Engle | ................. | G06F 9/5022 718/1 |
| 2014/0328214 A1* | 11/2014 | Iovanna | ................. | H04L 41/12 370/254 |
| 2015/0067153 A1* | 3/2015 | Bhattacharyya | ........ | H04L 43/04 709/224 |
| 2015/0078163 A1* | 3/2015 | Bryskin | ................. | H04L 47/22 370/235 |
| 2015/0161781 A1* | 6/2015 | Philbert | ................. | G06T 7/0004 382/141 |
| 2015/0212856 A1* | 7/2015 | Shanmuganathan | ........ | G06F 9/5027 709/226 |
| 2016/0142130 A1* | 5/2016 | Hudson | ................. | H04B 7/18513 370/316 |
| 2016/0234109 A1* | 8/2016 | Iovanna | ................. | H04L 45/70 |
| 2016/0269308 A1* | 9/2016 | Lee | ................. | H04L 47/70 |
| 2016/0330137 A1* | 11/2016 | Avci | ................. | G06F 9/5016 |
| 2016/0352648 A1* | 12/2016 | Iovanna | ................. | H04L 45/02 |
| 2017/0208016 A1* | 7/2017 | Lehane | ................. | H04L 47/70 |
| 2017/0339014 A1* | 11/2017 | Smith | ................. | H04W 16/14 |
| 2018/0103379 A1* | 4/2018 | Smith | ................. | H04W 72/04 |

FOREIGN PATENT DOCUMENTS

| | | |
|---|---|---|
| WO | 2013079225 A1 | 6/2013 |
| WO | 2015043681 A1 | 4/2015 |

OTHER PUBLICATIONS

King et al., "The Application of the Path Computation Element Architecture to the etermination of a Sequence of Domains in MPLS and GMPLS," Internet Engineering Task Force (IETF), Request for Comments: 6805, Nov. 2012.

Tran et al., "Adaptive Bandwidth Provisioning with Explicit Respect to QoS Requirements," Computer communications, Oct. 2005, vol. 28, No. 16.

ETSI, "LTE; Evolved Universal Terrestrial Radio Access (E-UTRA); Physical channels and modulation (3GPP TS 36.211 version 12.3.0 Release 12)," Technical Specification, ETSI TS 136 211 V12.3.0, Oct. 2014.

ETSI, "LTE; Evolved Universal Terrestrial Radio Access (E-UTRA) and Evolved Universal Terrestrial Radio Access Network (E-UTRAN); Overall description; Stage 2 (3GPP TS 36.300 version 11.11.0 Release 11)," Technical Specification, ETSI TS 136 300 V11.11.0, Sep. 2014.

ETSI, "LTE; Evolved Universal Terrestrial Radio Access (E-UTRA) and Evolved Universal Terrestrial Radio Access Network (E-UTRAN);

(56) References Cited

OTHER PUBLICATIONS

Overall description; Stage 2 (3GPP TS 36.300 version 12.3.0 Release 12)," Technical Specification, ETSI TS 136 300 V12.3.0, Sep. 2014.

ETSI, "LTE; Evolved Universal Terrestrial Radio Access (E-UTRA); User Equipment (UE) procedures in idle mode (3GPP TS 36.304 version 11.6.0 Release 11)," Technical Specification, ETSI TS 136 304, V11.6.0, Jan. 2014.

Farrel, A., et al.; "A Path Computation Element (PCE)-Based Architecture"; AT&T, Network Working Group, Request for Comments: 4655; Aug. 2006; pp. 1-40.

\* cited by examiner

METHOD AND APPARATUS FOR ALLOCATING PHYSICAL RESOURCES TO A SUMMARIZED RESOURCE

TECHNICAL FIELD

Aspects of the invention relate to a method and apparatus of modifying an allocation of physical resources to a summarized resource.

BACKGROUND

Hierarchical routing and network summarization are approaches realized in order to solve scalability issues for routing in a multi-domain scenario. The global topology of a multi-domain network comprising a huge number of nodes can cause scalability issues.

A hierarchical path calculation element (H-PCE) for multi-domain scenario is described in IETF RFC-4655 and IETF RFC 6805. In this model there are two levels of path computation. The high level is named Parent PCE (P-PCE) and it is responsible for end-to-end (E2E) path computation determining the sequence of the domain to cross, while the low level is called a child PCE (C-PCE). C-PCE is responsible for computing the internal path of the controlled domain that is associated with the E2E path computation of the parent domain.

A H-PCE can perform multi-domain path computation in different ways. One of such ways is creating a virtual topology where a Parent PCE computes E2E paths. The virtual topology is fed by a C-PCE a set of summarized information of the physical domain.

Hierarchical routing allows providing one or more abstraction layers to the network, so that the routing tasks can be performed by more entities (e.g. PCEs), and in parallel. In some examples of networks, the visibility of the network is layered, so that each layer deals with a smaller (e.g. technology-specific) network.

Summarization, in a multi-domain context, is a way to depict a network physical resources set with a logical network, in order to reduce the amount of topology information to be distributed through the physical network. This decreases routing computation time and preserves confidentiality of each domain.

Summarization mechanisms allow a reduction in the amount of routing information, as well as signaling information, topology information and network complexity. Moreover, such summarized information can be exported between layers according to the layer-specific needs. In some examples of networks, hierarchical routing is used in a multilayer network, for example, to simplify the amount of information that a server layer exports to client layer.

The combined use of both hierarchical routing and network summarization allows a reduction in the number of resources to be managed and allows the preserving of confidentiality in the multi-domain context. However, a result is a less detailed knowledge of the network resources.

An improved summarization of resources in this context would allow improved end-to-end routing.

SUMMARY

A first aspect of the present invention provides a method of adapting an association of physical resources in a network with a summarized resource corresponding to one or more class of service. The method comprises monitoring at least one parameter of the summarized resources. The method further comprises comparing the at least one parameter between a plurality of summarized resources, and comparing the class of service of the summarized resources. Based on the comparing of the at least one parameter and based on the comparing of the class of service of the summarized resources, the method further comprises determining one or more summarized resources to be a source for providing physical resources and determining one or more summarized resources to be a destination for receiving physical resources. Based on the determining, the method further comprises modifying an allocation of physical resources by transferring an association of physical resources from the source summarized resource to the destination summarized resource.

Thus, a summarization of the network is improved.

A second aspect of the present invention provides an apparatus configured to adapt an association of physical resources with a summarized resource in a network. The apparatus comprises a monitoring unit configured to receive information on at least one parameter of physical resources associated with a said summarized resource. The apparatus further comprises a calculation unit configured to compare the at least one parameter between a plurality of summarized resources, and compare the class of service of the summarized resources. The calculation unit is configured to, based on the comparing of the at least one parameter and the class of service of the summarized resources, determine one or more summarized resources to be a source for providing physical resources and determining one or more summarized resources to be a destination for receiving physical resources. The calculation unit is configured to, based on the determining, modify an allocation of physical resources by transferring an association of physical resources from the source summarized resource to the destination summarized resource.

According to another aspect of the present invention, there is provided a computer program product, configured when run on a computer to conduct a method according to any one of the methods defined in the appended claims.

BRIEF DESCRIPTION OF THE DRAWINGS

Embodiments of the present invention will now be described, by way of example only, with reference to the accompanying drawings in which.

DETAILED DESCRIPTION

Figure 1:
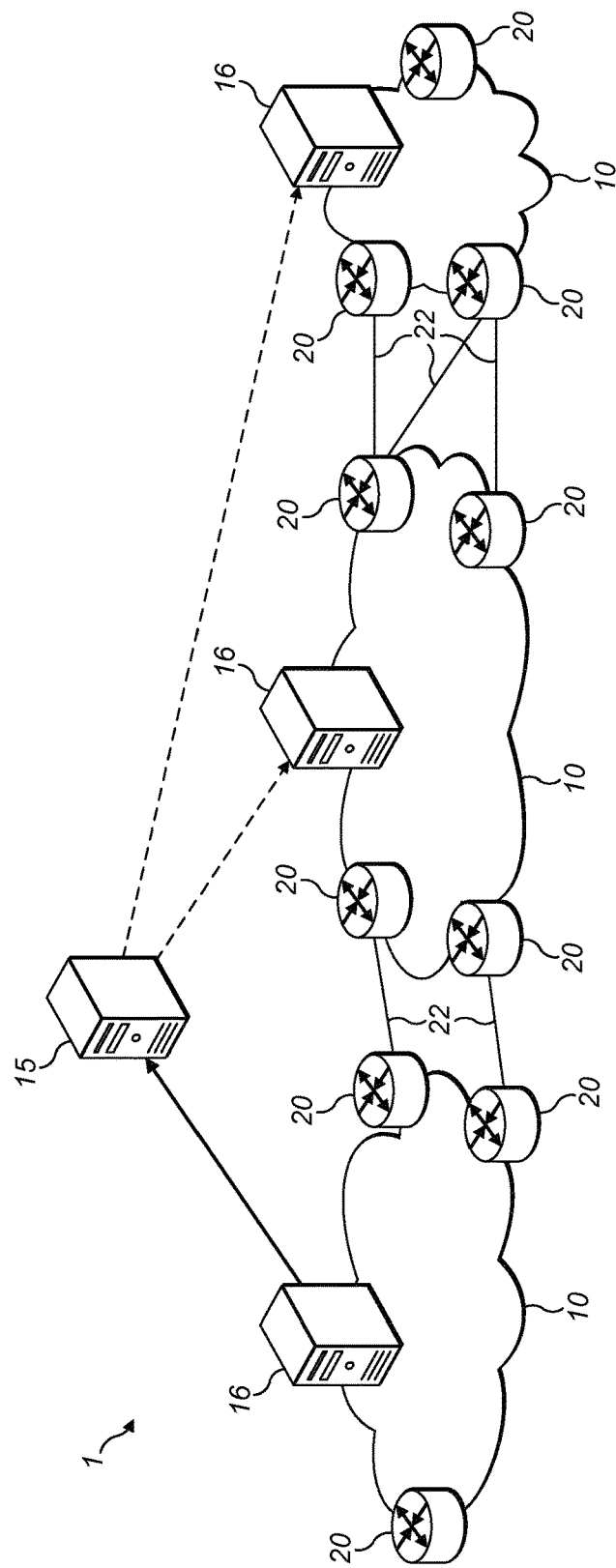
FIG. 1 shows an example of a network according to an example of the invention.

FIG. 1 shows an example of a hierarchical Path Computation Element (PCE) architecture in a network 1 in which examples of the present invention are based. In this architecture, PCEs are organized in multiple levels. For example, the high level PCE is named the Parent PCE 15 and is responsible for the E2E path computation. The parent PCE works on a virtual topology comprising one or more summarized domains 10. The low level is composed by a child PCE 16 that has full information on a single domain. The child PCE provides a summarized topology to the Parent PCE 15, e.g. for composing a virtual topology of all domains.

In some examples, hierarchical routing is used in a multi-layer network, for example, to simplify the amount of information that a server layer exports to client layer. Aspects of the invention relate to any architecture that allows hierarchical routing, e.g. using a H-PCE. Aspects of the invention may relate to a multi-layer network, for example, to simplify the amount of information that a server layer exports to client layer.

In the network 1, a plurality of domains 10 comprises a plurality of network nodes 20. For example, the network nodes 20 are edge nodes 20 having one or more inter-domain links 22 to an edge node 20 of another domain.

The child PCEs 16 are connected to a parent PCE 15. Each child PCE does not have information of the whole network. The PCEs are arranged as one or more parent PCE 15 or one or more child PCE 16. The examples are described for only one parent PCE, and may be extended to a plurality of parent PCEs.

The parent PCE 15 is responsible for selecting a path crossing an E2E domain and any number of child domains by coordinating with child PCEs. The parent PCE 15 examines a topology map that shows domain inter-connectivity. In some examples, the parent PCE 15 is only aware of the connectivity among the domains, and provides coordination to the child PCEs 16. The parent PCE 15 may alternatively be termed a top PCE, or upper-hierarchical PCE.

The child PCEs 16 are responsible for computing the path across one or more specific (child) domains. Each domain 10 has an associated child PCE 16. A child PCE 16 maintains a relationship with at least one parent PCE 15. The child PCE 16 may alternatively be termed a PCE, subsidiary PCE or PCE for computing the path across a domain 10.

The arrangement and number of domains is not limited by the example shown in FIG. 1. For example, the network 1 may comprise a further domain 10 connected to any one or more of the domains shown.

In an example, a path request is sent to the parent PCE 15, which communicates with the child PCEs 16 about their connectivity between the candidate intra-domain connections. Once the answer is known, the best solution is selected and the solution is transmitted to the source child PCE 16. This hierarchical model is applicable to any domain, for example, optical or packet, vendor or control. In particular, the network is composed by sub-networks and the routing areas have relationship between peers.

A PCE 15, 16 is an entity that is capable of computing a network path or route based on a network graph, and of applying computational constraints during the computation. The PCE 15, 16 is an entity or application that can be located within a network node or component, on an out-of-network server, or at any location where the PCE can provide its function. For example, a PCE 15, 16 is able to compute the path of a Label Switched Path (LSP). For example, the computation comprise operating on a Traffic Engineering Database (TED) and considering bandwidth and other constraints applicable to the TE LSP service request.

A domain is any collection of network elements (or nodes) within a common sphere of address management or path computation responsibility. Examples of domains include Interior Gateway Protocol (IGP) areas, Autonomous Systems (AS), and multiple AS within a Service Provider network. Domains of path computation responsibility may also exist as sub-domains of areas or AS.

An example of the invention is applicable to an optical network. One or more intra-domain links and/or inter-domain links 22 comprises optical connections. The network nodes 20 and further nodes within the domains 10 are optical nodes. For example, the optical nodes are configured for optical switching, e.g. as optical cross-connects. In some examples, the network elements or nodes may not have a control plane or routing capability. Such network elements only have a data plane and a management plane, and all cross-connections are made from the management plane. It is possible to run the path computation on the child PCE 16, and to send the cross-connection commands to each node on the computed path.

Any client application requesting a path computation to be performed by the Path Computation Element may be termed a Path Computation Client (PCC), e.g. a Label Switch Router (LSR). In some examples, a PCC would be an element of the management plane, e.g. residing in a Network Management System (NMS) or Operations Support System (OSS).

In some examples, the network 1 uses a connectionless communication or a connection-orientated communication. At least part of the network 1 according to an example of the invention may route traffic using label switched paths (LSPs). In some examples, the network 1 utilizes Multi-Protocol Label Switching (MPLS) or Generalized Multi-Protocol Label Switching (GMPLS). In some examples, the network nodes switch traffic based on wavelength (lambda-switching) or timeslot (e.g. a data unit in a time-division multiplexed signal, e.g. in SDH/SONET). Aspects of the invention are applicable to a Software Defined Network. Aspects of the invention are applicable to Automatically Switched Optical Network (ASON)-capable networks. Aspects of the invention may also be used for interworking between GMPLS-capable and GMPLS-incapable networks.

Aspects of the invention determine which portions of a network require a new resource distribution. In some examples, aspects of the invention comprise at least one monitoring mechanism which monitors or supervises how the resources are used within a domain. In some examples, the at least one monitoring mechanism provides information for use in resource adjustment, e.g. for intra-domain resources.

Figure 2:
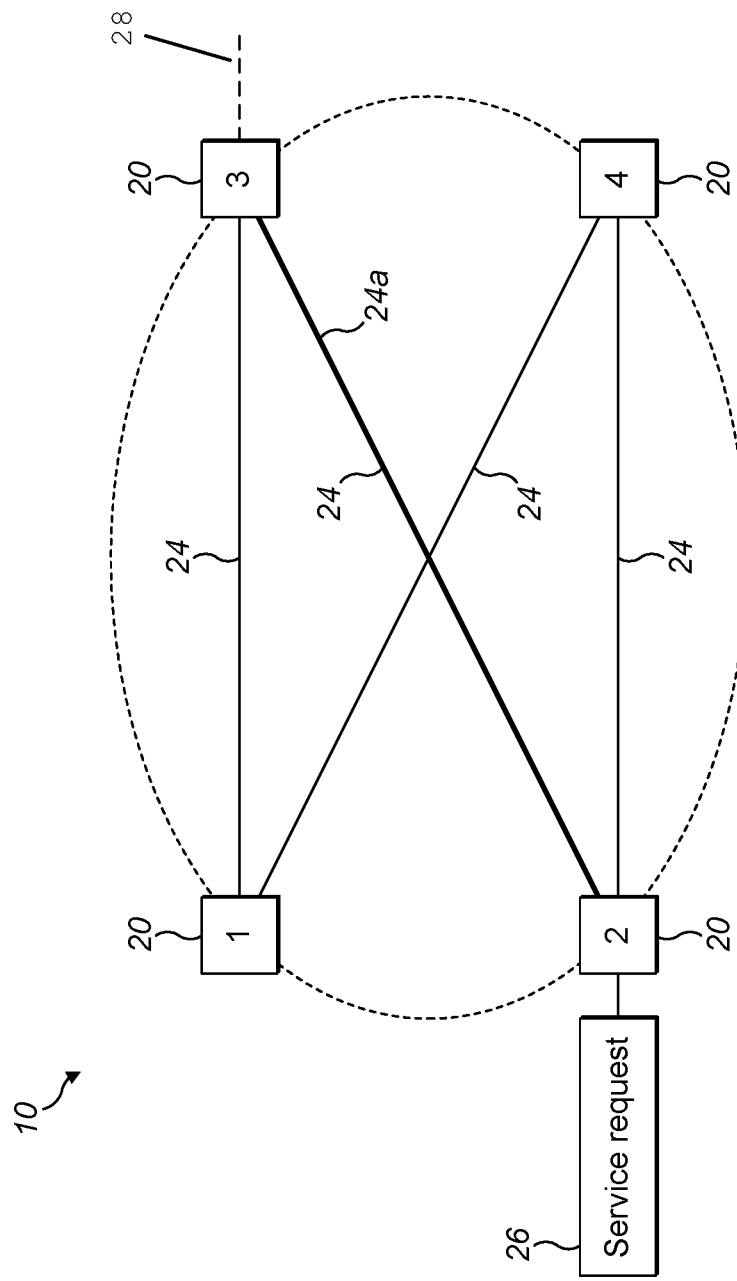
FIG. 2 shows an example of a domain according to an example of the invention.

FIG. 2 shows an example of a domain 10, having border network nodes 20. In this example, the domain 10 comprises four border nodes 20. The nodes 20 are connected by a mesh of links 24. The links 24 shown are examples of summarized or virtual links or resources. The links 24 may indicate a logical connection between the nodes 20, used by the parent PCE 15. The summarized resource or link is a summary of physical resources, provided to the Parent PCE to simplify E2E routing. The links 24 are generally implemented with further network nodes or elements (not shown). The child PCE 16 is configured to calculate how network nodes within the domain 10 are configured to obtain the summarized links 24 shown. The traffic can be considered as routed hierarchically. Aspects of the invention relate to the adapting of a summarization of resources, e.g. in a hierarchically routed network.

In examples, a service request 26 is received on network node 2 from outside of the domain 10. The request is for a path to network node 3, and so link 24a is utilized. The traffic exits the domain 10 on a connection 28 to another domain. The link 24a is an example of a summarized resource used by the Parent PCE for end-to-end routing.

The summarized resource relates to one or more particular class of service (CoS). As such, the summarized resource may be referred to as a CoS summarized resource. The CoS summarized resources handles only traffic having an associated one or more class of service. The associated one or more class of service is a subset of the available classes of service. A plurality of classes of service may be indicated, which are mapped to a plurality of CoS summarized resources depending on the indicated class of service. Traffic relating to different CoS may be handled by different CoS summarized resources. One or more indicated classes of service may be grouped together to be handled by a single summarized resource. In some examples, a path between relevant nodes are computed according to class of service or groups of class or service, the corresponding connection resource being considered as a part of a CoS summarized resource.

CoS may be considered as the combination of one or more of: network constraints, traffic constraints, feature constraints and operator policy. The CoS may be determined based on any one or more of those factors. The term CoS may be replaced or used in combination with any of those factors.

Class of service may generally be considered as a parameter indicating a priority or importance of traffic. For example, the priority may relate to a priority of a payload of a packet. The CoS may be indicated by a field in a Layer 2 (e.g. Ethernet) protocol. In some examples, the CoS is selected from one of eight classes of service. Generally, a class of service may be considered as high if the packet is considered a high priority (i.e. relatively important), and class of service may be considered as low if the packet is considered a low priority (i.e. relatively not important). The CoS may alternatively or in addition indicate network constraints or traffic/features constraints. Generally, CoS is a value which may be directly compared with another value of CoS, e.g. as numerical values, with an established hierarchy of importance.

The CoS is based on one or more parameters. For example, bandwidth may be a or the only CoS parameter. Aspects of the invention are applicable to any other CoS parameter (e.g. delay, jitter, loss) or to any mix of CoS parameters.

Bandwidth may refer to a guaranteed bandwidth and/or a peak bandwidth. In some examples, the bandwidth is mapped in a transport connectivity according to a specific priority, e.g. as fixed by an operator. For example, a transport connection can be mapped on the peak bandwidth of the service.

A CoS summarized resource is associated with particular physical resources. As such, different CoS summarized resources are associated with different particular physical resources. The class of service determines which CoS summarized resource is allocated, and therefore which physical resource is used. The path taken between nodes of a given network are computed according to a given CoS (or group of CoS). The correspondent connection resources are considered as clustered into CoS summarized resources.

Examples of the invention relate to any network with summarized connectivity resources clustered in CoS 'baskets'. The CoS summarized resources may alternatively be termed CoS baskets. In some aspects, a CoS basket is the list of physical resources (e.g. internal paths) that can be used to provide the specified CoS.

Aspects of the invention relate to allocating connection resources (i.e. physical resources) to a CoS summarized resource, as the traffic changes dynamically. This may be considered as refilling the set of available connection resources of a given CoS by following the change in traffic dynamically.

Examples of the invention provide for monitoring of at least one parameter of the physical resources. CoS summarized resources are monitored in order to collect statistical information on a per-summarized resources basis. The monitoring is for each CoS summarized resources.

The parameter is measured separately for each of the CoS summarized resources. In some examples, the monitoring is over a pre-determined time or window. The modification of the allocation of resources to a summarized resource is based on the measurements taken over that pre-determined time. Some examples comprise allocating the physical resources based on the monitoring of the at least one parameter of the physical resources, e.g. for the pre-determined time.

In some examples, the one or more monitored parameter relates to available physical resources associated with a particular summarized resource, and in particular, an amount or lack of such an available physical resource. The monitored parameter may be any one or more of not served requests, amount of available resources, or amount of available resources being below a threshold. These parameters are described in more detail below:

1) Not served requests are due to a lack of resources of the basket. The number of not served requests provides an indication of the amount of lack of resources. In some cases, there are traffic demands which did not find routes. The parameter is a count or measure of this not served demand. The parameter may be a measure of the number of traffic demands which were not served and/or a measure of the amount of bandwidth corresponding to this not served demand. The not served requests (demand) may be considered as an amount of additional physical resources required. The parameter may be considered as a parameter of handling the traffic by the physical resources. For example, the not served demand relates to the excess traffic which cannot be handled by the physical resources of that CoS summarized resource. In some aspects, the parameter may not be considered as a parameter which corresponds to a handling of traffic.

2) A further example of a parameter is a measurement of how often the available resources are low. For example, the monitoring compares the available physical (connection) resources (e.g. intra-domain paths) with one or more thresholds. The summarized resource status may be considered as in a 'Critical' state if the available physical resources are below a first threshold. The first threshold may be, for example, 10% of the available physical resources. A number of instances of the available connection resources falling below the first threshold is recorded.

3) In some examples, the available physical resources are compared with a second threshold. The second threshold may indicate that the basket status is considered to be in a 'Slack' state. For example, this basket status is determined if the available physical (connection) resources (i.e. intra-domain paths) number is less than 30% of the available resources. If the available physical resources are less than the second threshold (and greater than the first threshold), this indicates that the available physical resources are relatively low, but not yet critical. The second threshold is higher (i.e. more available physical resources) than the first threshold. A number of instances of the available connection resources falling below the second threshold is recorded.

In an aspect of the invention, traffic requests are monitored. The traffic requests are monitored over the same time window as the parameters indicating the availability of connection resources are measured. The traffic requests and parameters indicating availability may be monitored at the same time, i.e. simultaneously.

In some aspects, the monitored traffic requests are used to predict future traffic, i.e. forecast traffic. For example, a prediction scheme is used to predict traffic, e.g. in the next pre-determined time window. For example, the predictions scheme may be based on Exponential Smoothing (ES), delay-based with prediction, or delay-based without prediction. The prediction scheme may be used to generate Forecasted Traffic Matrix (FTM). In some examples, a FTM is built, for example as described in Hung Tuan Tran, Thomas Ziegler—"Adaptive bandwidth provisioning with explicit respect to QoS requirements", 2005. Alternatively, the forecast traffic may be considered to be the same as the average current traffic in the last one or more time windows.

In some aspects, the Forecasted Traffic Matrix (FTM) is built from CoS measurements. The more the FTM is close to the real traffic demand, the more the computed connection resources, used to fill the CoS baskets, will satisfy the service requests, avoiding critical situation such as under-provisioning of the baskets and correspondent lack of connection resources in some points of the network. The summarization according to aspects of the invention uses a predicted traffic, e.g. FTM, in order to allocate physical resources to one or more summarized resources to service the future (predicted) traffic.

Aspects of the invention use as inputs the information from both the monitoring of the CoS summarized resources and the forecast traffic. In particular, the monitoring of the CoS summarized resources relates to an availability of connection resources in each CoS summarized resources, for example, according to any of the parameters defined.

Examples of the invention use these inputs to determine how the allocation of connection resources between the CoS summarized resources should be changed. In addition, a further input is the class of service to which each CoS basket relates. Alternatively, any one or more of these inputs is used to determine how the allocation of connection resources between the CoS summarized resources should be changed.

The plurality of CoS summarized resources are compared with each other. In particular, the parameters indicating availability of physical resources in the CoS summarized resources are compared. In some examples, the particular value of the class of service allocated to each CoS summarized resources is also compared. The comparison of CoS summarized resources allows identification of those CoS summarized resources which should be allocated additional connection resources, and allows identification of sources for such additional connection resources.

The CoS summarized resources having relatively low availability of connection requests and optionally a relatively high CoS are identified as requiring an allocation of additional connection resources. The CoS summarized resources having relatively high availability of connection requests and optionally a relatively low CoS are identified as potential sources of additional connection resources to be allocated to other CoS summarized resources having a greater need. The relatively high or low determination is made relative to the other CoS summarized resources monitored, e.g. in the domain.

In some examples, the baskets are ordered according to the one or more measured parameters indicating availability of connection (physical) resources. If the parameters indicating availability of connection resources are substantially equal, or within a pre-defined range, then the ordering is by the value of CoS. As such, the ordering is based on the CoS associated with each CoS summarized resource.

Alternatively, the parameters indicating availability of connection resources and CoS are used simultaneously to order the CoS baskets into those receiving/providing additional connection resources. For example, the parameters indicating availability of connection resources and CoS are both used to assign a single parameter or score for a CoS basket, which is then compared to the parameter or score for other baskets.

As a result, an ordered list of baskets may be considered as determined, from the ones having an over-provisioning of resources (in particular for low CoS) to the ones having, instead, an under-provisioning of resources (in particular for high CoS). One or more of the CoS summarized resources which are most able to provide resources (e.g. over-provisioned based on forecast traffic and/or on CoS) may be termed as a source for providing physical resources. One or more of the CoS summarized resources which most require additional resources (e.g. under-provisioned based on forecast traffic and/or on CoS) may be termed as a destination for receiving physical resources. In some examples, physical resources are transferred from the source summarized resources to the destination summarized resources. In some aspects, only the summarized resources determined to be source and destination summarized resources are involved in the re-allocation. The source and destination may be only a subset of the summarized resources, i.e. not all of the summarized resources provide or receive physical resources.

In some aspects, the CoS summarized resources may be considered as sorted or identified by both CoS and occurrence of under-availability of connection resources. According to the performed sorting, resources of the CoS baskets having the higher connection resources' availability and the lower CoS are released. With such new resources available in the network, new paths are computed and new connection resources are allocated to the CoS baskets having the lower connection resource availability and the higher CoS.

For a CoS summarized resource identified as a source of connection resources to be allocated to another CoS summarized resource, the one or more connection resource to be allocated is identified. The connection resource(s) to be released from a source CoS summarized resource is/are determined according to a criteria. In some examples, the connection resources to be released is determined according to a criteria related to the determination of CoS. In other examples, the connection resource to be allocated to a different CoS basket is based on a criteria independently of the CoS. For example, the connection (physical) resource to be transferred is based on bandwidth of the connection (physical) resources.

In some aspects, a transport connection can map different service bandwidths. For example, an operator policy is to assure capacity for peak traffic, so a bandwidth of a path is equal to a service peak. For example, in a transport path, different guaranteed bandwidths can be mapped maintaining the same peak bandwidth.

The different guaranteed bandwidths relate to one or more combinations of values that satisfy: CIR+EIR=transport path capacity, where CIR is the Committed information rate and EIR is the Excess Information Rate. In some examples, the transport path is 1 GB/s. This example may refer to Metro Ethernet Forum (MEF) parameters.

In some aspects, a transport connection is used to transport more services between endpoints of the transport path. These parameters are an example of service, e.g. the case of Ethernet service that is represented with different parameter with respect to the network parameters (e.g. optical, MPLS). The CoS could relate to one or more of: the contract that the operator would like to meet that include these parameters (e.g. Ethernet service), resiliency parameters (e.g. protection, etc.) and availability (e.g. the service is guaranteed for a certain percentage of time, e.g. with respect to another service). In some examples, CoS may be considered indicating or an example of operator policy.

In some examples, within each summarized resource the connection resources are sorted from the least relevant to the most relevant. This sorting corresponds to the first ones that can be released, to the last releasable ones. For example, the order of release may correspond to the bandwidth of the summarized resource, e.g. proportional to the bandwidth. In this, a relatively low bandwidth resource may be considered as released first, e.g. as a less relevant resource. Increasing bandwidth resources are released subsequently, in order of bandwidth. As such, in a re-summarization, a smallest bandwidth physical resource of a summarized resource considered as a source of physical resources is transferred to a destination summarized resource.

The one or more connection resources released from a source CoS summarized resource are those which are determined to be the least relevant. For example, the connection resource with the smallest bandwidth is released first, followed by the next smallest bandwidth resource at a same or subsequent re-summarization.

Alternatively, a different criterion may be applied to select the physical resource to be transferred, e.g. largest in the source CoS summarized resource or having a bandwidth within a pre-defined range or to meet a dynamically defined requirement of the destination summarized resource.

Aspects of the invention comprise tuning the parameters of the CoS summarized resources (baskets), such that the baskets with the most critical resource availability situations (e.g. largest number of un-served requests) are provisioned with more connection resources. In some examples, a basket is considered to be the set of physical resources that is put together according to some network, traffic and/or operator policy parameters to represent a CoS.

In some examples, the alarm thresholds are modified after a re-allocation of resources. When a CoS basket has a change in the associated physical resources, one or more threshold can be adjusted according to the amount of resources left in it. For example, if physical resources are moved from a particular CoS basket, the existing threshold is lowered. This prevents the threshold being too high with respect to the remaining resources. For example, the alarm thresholds are based on an amount of available resources (e.g. paths). The first and second thresholds of the available physical resources may be considered as alarm thresholds.

As a result, a dynamic re-optimizing of the network summarized resources is made according to traffic predictions and relevant TE-parameters, such as bandwidth. Moreover, the network blocking probability is reduced and the need of triggering a full new summarization is significantly reduced. The number of un-served requests is also reduced.

Based on the monitoring of the baskets and the predicted traffic (FTM), the baskets may be re-optimized in terms of number of available connection resources. In some examples, the CoS summarized resources are optimized using one or more parameters or thresholds relating to the number of connection resources. For example, each CoS summarized resource may be allocated connection resources according to a maximum connection resource parameter (MaxCR) and/or a minimum connection resource parameter (MinCR). The maximum and/or minimum connection resource parameter are based on the monitoring and CoS, and are assigned per basket.

The maximum connection resource parameter (MaxCR) indicates the maximum number of connection resources available to a particular CoS basket. This parameter is used during a re-summarization. This ensures that a particular CoS basket is not overprovided with connection resources which are more effectively used elsewhere, based on the monitoring and CoS of the basket.

The minimum connection resource parameter (MinCR) indicates a minimum number of available connection resources to be guaranteed for the basket for assuring a given minimum network connectivity. This parameter is used during a re-summarization. This ensures that a particular CoS basket has sufficient connection resources, based on the monitoring and CoS of the basket.

The comparison of summarized resources, e.g. a sorting, provides for a clear analysis of relative requirements (basket stress) and sources of connection resources. This allows parameters for each summarized resource to be determined or renegotiated. Summarized resources that indicate low or insufficient amounts of available resources (e.g. have high values of not served requests and number of occurrences of availability less than the 'Slack' and 'Critical' thresholds) should be provided, if possible, with more connection resources in order to meet the predicted traffic. In order to provide more connection resources for such summarized resources, the value of the maximum connection resource parameter will be increased. The amount of physical resources to be re-allocated (e.g. amount of change of MaxCR and/or MinCR) may be determined based on the one or more parameter of the summarization resources indicating physical resource availability and/or CoS.

On the contrary, summarized resources with lower values of such stress parameters are the first ones to release resources. The value of the maximum connection resource parameter will be decreased. For example, the maximum connection resource parameter will be decreased to a minimum value equal to the minimum connection resource parameter, in order to not compromise the network connectivity. The computations and evaluations are based on the TE needs (particularly the bandwidth needs) of the forecasted traffic.

According to these criteria, the less relevant connection resources of the baskets can be released, so that the network resources of the correspondent path can be made available again for new path computations. This way, path computation (e.g. by means of a PCE) can be performed in order to re-optimize the resources and provide new connection requests for each CoS basket, according to the new computed values for both maximum and minimum connection resource parameter for each of the baskets. In other words, the baskets that were individuated as the most stressed (insufficient resources), thanks to the statistical information collection performed during the monitoring window, can be then refilled with the new connection resources. The new connection resources are computed taking into account the network resources freed from more plenty baskets, according to the new computed basket parameters.

As a result, the network resources are re-distributed in order to make the basket composition closer to the real traffic. This reduces the blocking probability and the number of not served requests.

Figure 3:
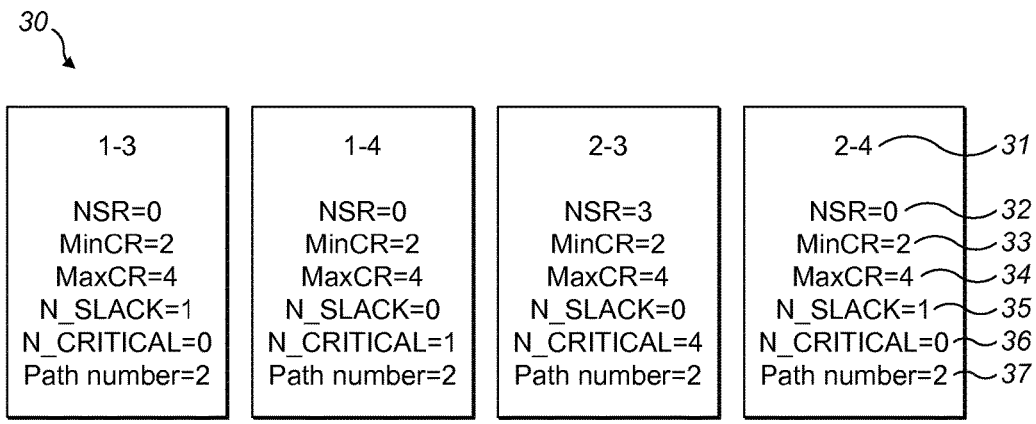
FIG. 3 shows a first set of values relating to summarized resources according to an example of the invention.
Figure 4:
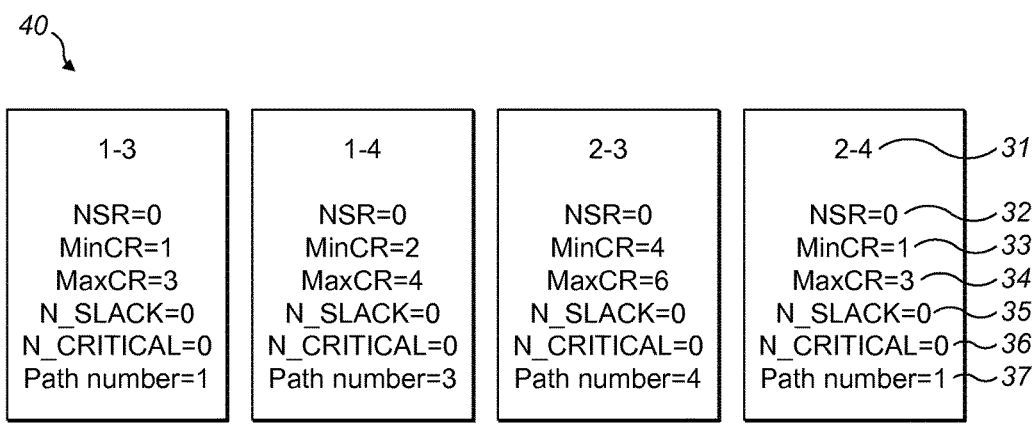
FIG. 4 shows a second set of values relating to summarized resources according to an example of the invention.

FIGS. 3 and 4 illustrate an example of the invention. FIG. 3 shows a set of values for each summarized resource in the network shown in FIG. 2. The values shown relate to both monitored parameters for each basket, and parameters which are set by the aspects of the invention in response to the monitoring.

FIG. 3 shows sets of values 30 for four summarized resources. The summarized resources correspond to the logical links 24. A label 31 for each set of values indicates the two nodes between which the link extends. The values and transport paths relate to a single direction.

The sets of values provide examples of values of monitored parameters at the end of a monitoring time window. In this example, values are shown for number of not served requests (NSR) 32, number of instances of available connection resources being below the second or 'Slack' threshold (N_SLACK) 35, and number of instances of available connection resources being below the first or 'Critical' threshold (N_CRITICAL) 36.

In this example, the summarized resources have the same values of maximum connection resource parameter (MaxCR) 34 and minimum connection resource parameter (MinCR) 33. This shows that the amount of physical resources were indicated to be assigned equally to the summarized resources, for the time period in which the monitored parameters were recorded. The actual number of connection resources (paths) 37 is also equal between these summarization resources.

According to the method described, based on the monitored parameters 32, 35, 36 the requirements for connection resources by the summarized resources are assessed. The method determines, and optionally places in order, the summarized resources requiring additional resources and the summarized resources which are most able to provide such summarized resources.

For example, summarized resources with a lower number of not served requested (less NSR) and a lower number of instances availability below a threshold (e.g. first and/or second threshold) are selected to release resources. In this example, the summarized resources for link 1-3 and link 2-4 are identified as the most able to donate some of their existing connection resources to another summarized resource.

Aspects of the invention also identify which summarized resource(s) requires additional resources. Based on the monitored values of the parameters, examples of the invention determine the quantity of additional resources to be provided. The additional quantity provided is optionally dependent on the available resources from summarized resources with relatively excess capacity of resources.

In this example, the summarized resource(s) requiring additional resources is based on the highest values of number of not served requested (high NSR) and a higher number of instances availability below a first and/or second threshold (high N_CRITICAL and N_SLACK). In this case, the summarized resource for link 2-3 and also for link 1-4 are selected to have more resources. The summarized resource for link 2-3 is determined from the monitoring to require more additional resources than link 1-4.

FIG. 4 shows sets of values 40 for the summarized resources, including a possible adjustment to the summarized resources following a monitoring period. In some cases, the monitoring is following evaluation of forecast traffic (FTM). The adjustment is made by changing the values of maximum connection resource parameter (MaxCR) and/or minimum connection resource parameter (MinCR). The MaxCR and MinCR are used by the summarization algorithm to allocate a quantity of connection resources above (or equal to) the minimum connection resource parameter MinCR and below (or equal to) the maximum connection resource parameter MaxCR. The MinCR and MaxCR parameters determined by the method based on the monitoring does not directly set the allocation of connection resources, but changes limits on the range of allocation.

In this example, the summarized resource most requiring additional resources is the link between node 2 and node 3, i.e. link 24a. This is determined from the parameters indicating under availability of resources 32, 35, 36. For this summarization resource (link 2-3) MaxCR and MinCR are increased. This ensures that the number of allocated paths is also increased. The path number 37 is shown as increased to 4.

In some examples, MinCR and MaxCR are maintained at the same values. For example, MinCR and MaxCR for the summarization resource for link 1-4 is unchanged. In this case, the number of paths is increased. In some examples, the method allows for an increase in the number of connection resources within the original range set by MinCR and MaxCR, by arranging to free up connection resources from other summarization resources. In some examples, this is done (e.g. for link 1-4) where additional connection resources are indicated to be needed from the monitored parameters, but another summarized resource(s) have a higher priority to be allocated resources. In this case, MinCR and MaxCR do not directly set the change in allocation of resources for each summarized resource. Instead, MinCR and MaxCR change in allocation of resources for other summarized resources, allowing a re-distribution within the original range. In this example, the number of paths for link 1-4 increases from 2 to 3 paths.

The increased resources for link 2-3 and 1-4 is allocated from the summarized resources for links 1-3 and 2-4. The summarized resources for links 1-3 and 2-4 are identified as having resources which may be distributed elsewhere. This is a relative determination made by comparing requirements with the other summarized resources. In particular, monitored parameters links 1-3 and 2-4 indicate at least one instance of under availability (N_SLACK 35). In comparison with the other summarized resources, links 1-3 and 2-4 have relatively less requirement for more resources, and so are identified as donors for connection resources. As a result, MinCR and MaxCR are reduced links 1-3 and 2-4. The number of paths 37 assigned is reduced as a result, in this case, to one path each.

The modified summarization resources are used to handle traffic, and monitored in a further monitoring window. A similar comparison and re-assignment of resources is made at the end of the next monitoring window. This process repeats and continues to adapt to changes in traffic.

In some aspects of the invention, there is provided a self-adapting summarization with respect to real network traffic. The solution provides a suitable automatic mechanism to re-adapt the summarization of a network according to its forecasted traffic and relative TE parameters (e.g. bandwidth).

Examples provide a dynamic re-optimization of summarization resources. The examples describe provide for re-optimizing the distribution of available resources among the CoS baskets. This is based on periodic information of the monitored resource baskets' stress.

Examples of the invention provide for a dynamic tuning of CoS resource baskets. The solution provides a dynamic tuning of the CoS resource Baskets' parameters, allowing them to best fit the real traffic requests. Re-optimization is based on TE parameters (such as bandwidth). All computations and evaluations are based on the TE needs (particularly the bandwidth needs) of the forecasted traffic and are not based just on previously defined and fixed parameters.

The physical resources have been described as intra-domain paths. The physical resources may alternatively or additionally refer to nodes, network elements, routers, switches, hubs, links, or any part of the summarized network.

Figure 5:
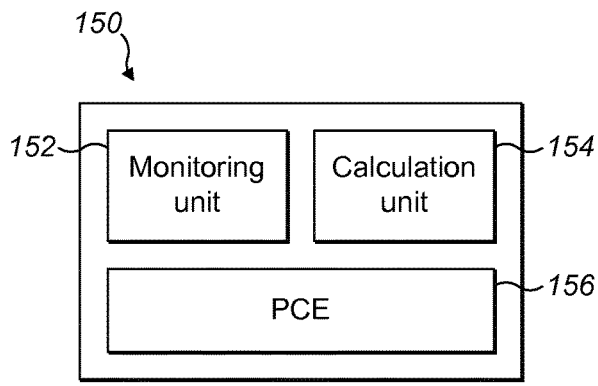
FIG. 5 shows an apparatus according to an example of the invention.

FIG. 5 shows a schematic illustration of an apparatus 150 according to an example of the invention. The apparatus 150 comprises one or more functional units configured to carry out examples of the method described.

In the example shown, the apparatus 150 comprises a monitoring unit 152. The monitoring unit 152 is arranged to monitor the physical resources of the summarized resources. The monitoring may comprise receiving information from one or more of the physical resources on the handling of traffic.

The apparatus 150 comprises a calculation unit 154. The calculation unit 154 is configured to receive the monitoring information from the monitoring unit 152. The calculation unit 154 is configured to carry out the method functions described above, e.g. comparison of summarized resources. In some aspects, the calculation unit 154 carries out the summarization phase.

In the example shown, the apparatus 150 comprises the Child PCE 156. The child PCE 156 is integrated with, or housed together with, the monitoring unit 152 and calculation unit 154. The calculation unit 154 and PCE 156 are connected. Alternatively, one or more of the monitoring unit 152, calculation unit 154 and PCE 156 are not located together. For example, the monitoring unit 152 and/or calculation unit 154 are located in any network node, management system (e.g. NMS) or node connected to the network or domain.

The child PCE 156 performs the usual PCE functions. In addition, the PCE 156 may carry out one or more of the functions described for the calculation unit 154 and/or monitoring unit 152. For example, the calculation unit 154 and/or monitoring unit 152 may be considered as functional units of the PCE.

In some examples, one or more of the monitoring unit 152, calculation unit 154 and PCE 156 may be integrated together. In some aspects, the monitoring unit 152, calculation unit 154 or PCE 156 may be implemented as hardware, software and/or firmware. The apparatus 150 comprises one or more processing unit, and optionally a memory, in order to implement the functions of the monitoring unit 152, calculation unit 154 and/or PCE 156.

Aspects of the present invention comprise a computer program or computer program product, configured to run on a computer or processing unit, to carry out at least some of the functions described. In some examples, one or more of the monitoring unit 152, calculation unit 154 and PCE 156 may be implemented in a network node, NMS, or in any apparatus connected to the domain or network.

Figure 6:
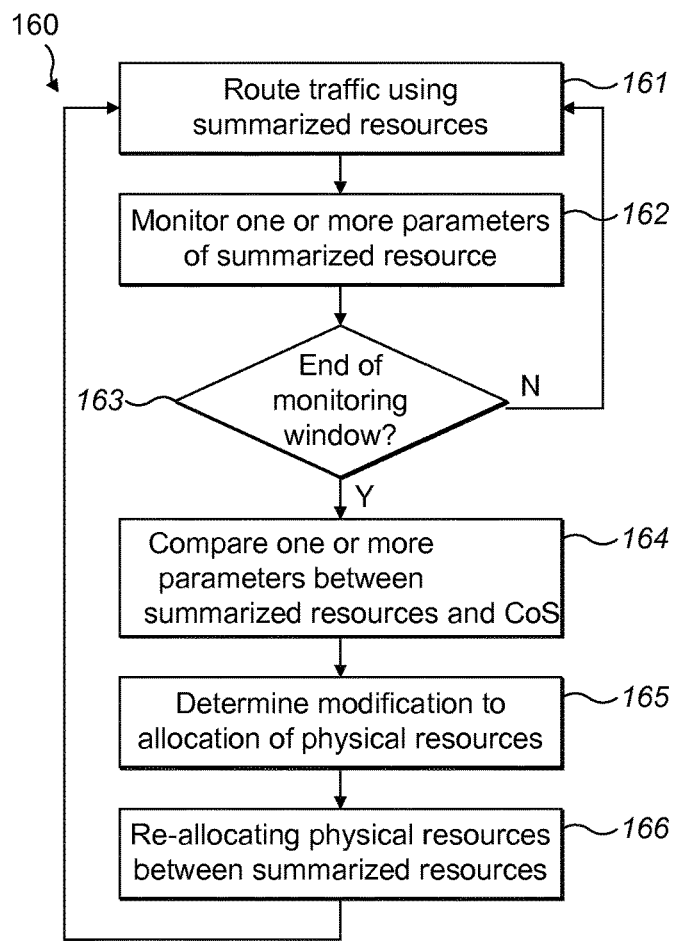
FIG. 6 shows a flowchart illustrating a method according to an example of the invention.

FIG. 6 shows an example method 160 according to an example of the invention. The method comprises routing traffic 161, for example, in or across a domain. The traffic is routed using one or more summarized resource. In some examples, the routing path is determined by a PCE.

The method also comprises monitoring parameters 162 of the summarization resources handling the traffic. The parameters indicate an ability of the summarized resource to handle the traffic, for example, by indicating connection resource availability. The parameters measured are one or more of those parameters described above. The monitoring and routing of the traffic occurs simultaneously and independently. The flowchart shown does not imply that the routing and monitoring are sequential. The monitoring is carried out without affecting the traffic routing.

The monitoring of the summarization resources is carried out until an end of a monitoring window is determined in 163. If the monitoring window has not yet elapsed in time, the traffic and monitoring continues. If the monitoring window has elapsed, the recorded parameters are analyzed. The traffic continues to be routed, independently of the end of the monitoring window and the analysis.

In 164, the summarized resources are analyzed by comparing the monitored parameters amongst the summarized resources. A comparison is made between the summarized resources. Thus, the analysis is based on the relative availability of connection resources between summarized resources. This contrasts with comparing the parameters (e.g. number of instances of resources being lower than a threshold) against a fixed or variable threshold. The comparison provides a relative determination on which summarized resources relatively require additional resources, and which summarized resources relatively can provide additional resources. The comparison comprises comparing CoS between summarized resources. The allocating physical resources is from a first (source) summarized resource to a second (destination) summarized resource, the second summarized resource having a lower availability of physical resources and/or a higher class of service than the first summarized resource.

In 165, one or more resource allocation parameters are determined based on the comparison of the monitored parameters between the summarized resources. The resource allocation parameters may be in the form of a maximum and minimum allocation as described above, or a determined specific allocation. The determination of one or more resource allocation parameters is also based on the forecast traffic for the next monitoring window. The determination of the resource allocation parameters includes a comparison of the CoS of the summarized resources. In some examples, the CoS is considered after the other parameters (e.g. after the parameters indicating physical resource availability, e.g. number of not served requests).

In 166, connection resources are re-allocated according to the determined resource allocation parameters. The re-summarization process uses the one or more resource allocation parameters. The physical resources of a summarized resource which are re-allocated are identified as described above, e.g. the least relevant resources are—allocated first. This ensures that the summarization is able to adapt the number of physical resources within each summarized resource, to make the most efficient use of the physical resources.

The adapted allocation of physical resources within each summarization resource is used for calculating the routes of subsequent traffic, e.g. by the PCE. The re-summarization is carried out at each monitoring window. In some examples, the monitoring windows depend on occurrences of service setup/teardown.

In some examples, the summary of the physical resources as seen by the Parent PCE is adapted. In this case, the Parent PCE is provided with a different summary. In other examples, the different physical resources associated with the summary do not affect the summary seen by the Parent PCE. In this case, the Parent PCE would generally not be notified.

Aspects of the present can be applied to any network node or product. The method described may be carried out by any network node or element attached to the network. For example, aspects of the invention may be implemented by a router, e.g. providing fixed and mobile network infrastructure, IP/MPLS edge routing, and/or Evolved Packet Gateway functionalities. Aspects of the invention may be implemented on or monitor a network element or node providing packet optical transport. The network monitored may be a Software Defined Network (SDN).

Aspects of the invention provide a method and apparatus to make summarization and routing methods asynchronous. The decoupling of summarization and routing allows a decrease in the entire computation time. This allows the summarization method to react to unpredictable traffic changes, typical of a dynamic scenario. In some examples, the monitoring 100 does not directly monitor the E2E traffic. The monitoring 100 measures the ability of the physical resources to handle the E2E. This monitoring can be carried out without knowledge of the original source and/or final destination of the traffic.

Aspects of the invention provide a method for re-optimizing the summarization of available network resources in a multi-layer network scenario, by using traffic predictions and/or self-adaptive mechanisms. This allows matching different policies of different network administrators. Aspects of the invention improve the reliability and stability of the summarized networks in a software defined network (SDN).

In some aspects, according to the hierarchical PCE framework, the parent PCE computes the E2E path on the E2E summarized topology. Every time a path is selected, each link of the E2E path can corresponds to a path in a domain 10. This is communicated to the Child PCE and the child PCE provide the corresponding physical paths corresponding to the same summarized link. This means that the variation of the physical paths corresponding to a summarized link (a basket) depends on the E2E routing.

In case more resources are required in certain portion of the domains 10 with respect to other portions (baskets), the Child PCE is arranged to provide more paths in a basket with respect to other baskets if required. In this case the cause is the E2E routing, in the sense that the choice of a virtual link in a domain is performed by the Parent PCE considering E2E routing. The domain performs the adaptation of the physical resources in a summarized link, without any knowledge of the overall E2E routing, i.e. what is occurring in the other domains. Thus, in a hierarchical network, the resources are adapted within a domain without knowledge of the E2E routing. Examples of the invention may use one or more of several possible traffic prediction algorithms, and tunable thresholds, improving its flexibility in order to match with different policies of different network administrators.

Examples of the invention are applicable to SDN. The method and system described improves the reliability and stability of the summarized networks in the context of a SDN framework.

The parallelization of summarization and routing phases allows creating a new virtualized topology, where the Parent PCE will route the future service requests, while the routing phase (Parent PCE) is running. In this way the routing phase is able to route the current service request, on the actual virtualization, and serve the future request without waiting the necessary computation time for the new network status summarization. The method needs as input parameters physical resource evaluations to configure the baskets status; it represents the number of resources (e.g. intra-domain paths) which are used by the child PCE for summarizing the domain. Aspects of the invention provide a solution that tunes the refilling of summarized resources according to traffic flow predictions, minimizing of the blocking probability for the forecasted traffic matrix service requests. As a result, a lack of summarized resources and consequent discard of some service requests are avoided.

Aspects of the invention provide a method that is able to determine which are the resources that are more needed in an E2E dynamic environment. The method works in advance in order to guarantee that the summarization is always updated according to the requests. Moreover the combination of traffic needs, network parameters and CoS (that includes operator policy) allows summarization which moves the resources where necessary in an efficient way. Thus, aspects of the invention provide for efficient resource optimization, maximizing the amount of traffic supported, and/or meeting the operator policy.

The definition of CoS in the method provides for combining the network parameters, an operator policy and/or the traffic forecast to allow the summarization to self-adapt and provide a smart and scalable E2E routing. The method allows to one or more of: dynamically sort and re-arrange the baskets, to correlate the traffic prediction, to combine network parameters, traffic forecast, and policy operator. Aspects of the invention provide a solution which is very efficient and key for applications such as SDN or network virtualization.

The invention may be defined in the claims by any combination of features described. For example, features relating to CoS may be considered as not essential, and claims defining the invention may be based on any combination of other features. For example, the summarized resources may not be based on a particular class of service and/or it is not essential to carry out a comparison of the class of services between summarized resources. Any aspect of any embodiment may be combined with any feature of any other embodiment.

The invention claimed is:

1. A method of adapting an association of physical resources in a hierarchical network with a summarized resource corresponding to one or more class of service, the method comprising:
   monitoring at least one parameter of each of a plurality of summarized resources;
   comparing the at least one parameter between the plurality of summarized resources;
   comparing class of service between the plurality of summarized resources;
   determining one or more summarized resources, of the plurality of summarized resources, to be a source for providing physical resources and determining one or more summarized resources, of the plurality of summarized resources, to be a destination for receiving physical resources, based on the comparing of the at least one parameter and based on the comparing of the class of service of the plurality of summarized resources and based on a forecast traffic matrix;
   modifying an allocation of physical resources by transferring an association of physical resources from a source summarized resource to a destination summarized resource, based on the determined source and destination summarized resources; and
   performing path computation for traffic requests in the hierarchical network based on the modified allocation of physical resources to the determined source and destination summarized resources.

2. The method as claimed in claim 1, wherein the at least one parameter of the plurality of summarized resources indicates an amount of available physical resources associated with a summarized resource, of the plurality of summarized resources, during a handling of traffic.

3. The method as claimed in claim 1, wherein the at least one parameter of the plurality of summarized resources comprises a count of the number of instances where an amount of available physical resources associated with a summarized resource, of the plurality of summarized resources, is below a threshold.

4. The method as claimed in claim 1, wherein the at least one parameter comprises a demand for the physical resources of a summarized resource, of the plurality of summarized resources, which is not currently served by the physical resources.

5. The method as claimed in claim 1, further comprising determining that at least some of the plurality of summarized resources are determined not to be a source or destination summarized resource, and do not have an allocation of physical resources modified.

6. The method as claimed in claim 1, further comprising modifying a value of one or more summarized resource parameter indicating a minimum and/or maximum amount of physical resources to be allocated to a summarized resource, of the plurality of summarized resources, and allocating physical resources to the summarized resource based on said one or more summarized resource parameter.

7. The method as claimed in claim 1, further comprising re-allocating a smallest bandwidth physical resource of a source summarized resource to a destination summarized resource.

8. The method as claimed in claim 1, wherein monitoring the at least one parameter of each of the plurality of summarized resources for a pre-determined time, and allocating the physical resources based on the monitoring of the at least one parameter of each of the plurality of summarized resources for the pre-determined time.

9. The method as claimed in claim 1, wherein the class of service indicates a class based on one or more of bandwidth, delay, jitter or loss.

10. The method as claimed in claim 1, wherein modifying the allocation of physical resources is based on a comparison of the class of service when a comparison between the at least one parameter of the plurality of summarized resources indicates that the at least one parameter of the plurality of summarized resources are equal or within a pre-determined range.

11. The method as claimed in claim 1, wherein the at least one parameter of the plurality of summarized resources and the class of service provides an ordering of the plurality of summarized resources, wherein the ordering determines the source and/or destination summarized resource and/or amount of physical resources to be re-allocated.

12. A memory storing a computer program product, when run on a computer, configured to conduct a method according to claim 1.

13. An apparatus configured to adapt an association of physical resources with a summarized resource in a hierarchical network, the apparatus comprising:

a processor;
a memory comprising a computer program executable by the processor;
a monitoring unit configured to receive information on at least one parameter of physical resources associated with each of a plurality of summarized resources;
a calculation unit configured to compare the at least one parameter between the plurality of summarized resources, and to compare class of service between the plurality of summarized resources,
wherein the calculation unit is further configured to, based on the comparing of the at least one parameter and the class of service of the plurality of summarized resources and based on a forecast traffic matrix, determine one or more summarized resources, of the plurality of summarized resources, to be a source for providing physical resources and determine one or more summarized resources, of the plurality of summarized resources, to be a destination for receiving physical resources, and
wherein the calculation unit is further configured to, based on the determined source and destination summarized resources, modify an allocation of physical resources by transferring an association of physical resources from a source summarized resource to a destination summarized resource; and
a path computation element configured to perform path computation for traffic requests in the hierarchical network based on the modified allocation of physical resources to the source and destination summarized resources.

14. The apparatus as claimed in claim 13, wherein the at least one parameter of the plurality of summarized resources indicates an amount of available physical resources associated with a summarized resource, of the plurality of summarized resources, during a handling of traffic.

15. The apparatus as claimed in claim 13, wherein the calculation unit is further configured to modify the allocation of physical resources by modifying a value of one or more summarized resource parameter indicating a minimum and/or maximum amount of physical resources to be allocated to a summarized resource, and allocating physical resources to the plurality of summarized resources based on said one or more summarized resource parameter.

16. The apparatus as claimed in claim 13, wherein the calculation unit is further configured to modify the allocation of physical resources by re-allocating a smallest bandwidth physical resource of a source summarized resource to a destination summarized resource.

17. The apparatus as claimed in claim 13, wherein the calculation unit is further configured to receive the at least one parameter of the plurality of summarized resources from a monitoring for a pre-determined time, and allocate the physical resources based on the monitoring of the at least one parameter of the plurality of summarized resources for the pre-determined time.

* * * * *